May 10, 1966  W. F. MORRIS, JR  3,250,086
CHILLING APPARATUS
Filed Feb. 9, 1959  2 Sheets-Sheet 1

INVENTOR.
William F. Morris, Jr.
BY
David Rabin
ATTORNEY

May 10, 1966  W. F. MORRIS, JR  3,250,086
CHILLING APPARATUS
Filed Feb. 9, 1959  2 Sheets-Sheet 2

*INVENTOR.*
William F. Morris, Jr.
BY
*David Rabin*
ATTORNEY

United States Patent Office 3,250,086
Patented May 10, 1966

3,250,086
CHILLING APPARATUS
William F. Morris, Jr., P.O. Box 9064, Raleigh, N.C.
Filed Feb. 9, 1959, Ser. No. 791,939
4 Claims. (Cl. 62—375)

The present invention relates to a poultry chilling method and apparatus and relates more particularly to (a) a process of handling and chilling dressed poultry in large quantities continuously to remove and rapidly chill the individual birds while the birds travel continuously along a directed path through a chilling medium of water or a slurry of ice and water, and (b) an apparatus for directing the flow of poultry along a path of travel while gently tumbling the individual birds to expose a maximum surface area to a chilling medium and introducing a chilling medium to flow over the advancing dressed poultry to rapidly remove body heat preparatory for further processing and packing.

The process of dressing poultry preparatory for marketing has within recent years become mechanized to a large degree in many operations, such as, scalding, plucking, singeing, eviscerating, weighing and packaging, among other operations, thereby making the former manual operations too costly for competitive operations and these manual operating plants are now virtually obsolete. Concomitant with some superior mechanized systems, the quality and wholesomeness of the dressed poultry has been maintained and in many instances improved. However, a major obstacle to more complete automation in the poultry dressing industry is the time cycle required for chilling poultry in order to remove the body heat after killing and the absorption of additional heat derived from the scalding and singeing operations and the handling of the poultry to and from the conventional chilling or cooling vats or tanks.

Presently, virtually all major poultry processing plants utilize large cooling or chilling tanks and vats which are charged for each chilling cycle with a slurry of ice and water into which the freshly killed and eviscerated birds are immersed in order to remove the sensible body heat as rapidly as possible. The volume of water and ice necessary to accomplish this chilling function varies considerably and is a substantial factor in the economical operation of the poulty processing plant. Normally the poultry weighing in the aggregate approximately six hundred to nine hundred pounds is dropped into the charged vats wherein, once the birds have settled compactly in the cooling slurry, the mixture remains quiescent or is agitated by air or pumps until the desired chilled temperature is reached which may take between forty-five minutes to several hours depending upon the temperature and volume of the chilling medium and the size and weight of the poultry introduced into the chilling tank. Normally once the poultry is placed into the chilling tank, little or no effective agitation of the mixture occurs and, as will be readily apparent, the transfer of heat is greatly impaired due to the compaction of the birds and the quiescence of the cooling medium. Furthermore, as the compacted birds communicate directly with each other and with the cooling medium some surfaces of the birds become partially chilled on the exposed surfaces but other surfaces become insulated resulting in unsatisfactory chilling. This objectionable differential chilling of the birds, which is not readily detectable unless each bird is examined carefully, is conducive to bacterial growth as the entire bird is not chilled uniformly and in the time required. Synthetic bacteria growth inhibitors are often necessary in order to counteract this objectionable feature.

The length of the chilling time cycle when vat chilling is employed necessitates a large number of vats being used in large poultry processing installations which is not only extremely costly in the initial expense but also the high cost of maintenance adds to the cost of operation. In addition, the conventional chilling methods are extremely costly because (a) the slurry o fice and water is usually flushed after each vat chilling, (b) the large floor space storage area required for the large number of vats whether in or out of operation, and (c) the large labor force required to attend and maintain the chilling vats including cleannig and maintenance repairs.

It has also been determined that poultry chilled in vats will tend to accumulate large or substantial quantities of water in the meat as well as under the skin. This is objectionable due to the weighing problem involved and also unless the water is removed in some manner, rapid deterioration will occur by bacteria growth unless the water is treated with an inhibitor. Usually some water draining time must be allowed either after the vats are emptied or in some installations when the birds are again suspended from a traveling conveyor sufficient time is allowed to drain excess water depending on when the evisceration operation occurs in the processing of the poultry.

Therefore, the present invention contemplates the method and apparatus for chilling poultry in which the body heat of poultry, and other incident heat, may be removed continuously and uniformly in a minimum period of time as each bird is being subjected to a gentle tumbling motion continuously along a directed path of travel through a chilling medium.

Another objective of this invention is to provide a method for chilling freshly killed poultry in which individual birds are urged to flow through a chilling medium, such as water or a slurry of ice and water, in a predetermined period of time.

Still another object of this invention is the provision of a novel mass chilling method for processing dressed poultry in which the individual birds are conveyed in a mass lot through a chilling medium and each bird is individually and uniformly chilled in a tempering or initial chilling medium continuously along a directed path of travel and then subjected to a final chilling medium containing a slurry of ice and water while continuing to travel continuously along a directed path of travel.

A further objective of this invention is to provide an apparatus for mass chilling continuously traveling freshly killed poultry by advancing the poultry in a prescribed path of travel while rotating and gently tumbling individual birds to expose the birds to the flow of a chilling medium through the apparatus.

Still a further objective of this invention is to provide a revolving cylindrical drum with poultry advancing and tumbling means for segregating individual birds as they are urged in a directed path of travel continuously through a chilling medium for optimum heat transfer, and means for introducing and maintaining and circulating a slurry of water and ice in the drum through which medium the poultry passes in a directed path of travel.

Another feature of this invention is to provide a compact revolving drum in which internal reticulated baffles are provided for advancing poultry in the directed path of travel and in which a chilling medium, such as chilled water or a slurry of ice and water, may flow through the baffles to remove body heat and incident heat uniformly from individual birds as they advance through the drum at least partially submerged in the chilling medium.

This invention further contemplates a continuously operated mass chilling system for freshly killed poultry in the application of a two-stage unit in which at least two separate revolving chilling drums are arranged in series with the first drum serving as a quenching bath for the removal of body and incident heat of the birds at the elevated temperatures by passing the birds through a chilling medium flowing through the drum in the opposite direction and then introducing the birds into a second chilling drum in which the birds are advanced through a chilling medium, such as a slurry of ice and water, having a temperature below that of the quenching bath, and the means for withdrawing the birds at the terminal ends of each of the drums for drainage of excess chilling medium.

It is contemplated by the application of the method and apparatus of this invention that the better control and uniform chilling derived from this process will shorten the poultry chilling cycle resulting in better quality, more wholesome flavor birds which will be achieved at a direct reduction in cost per pound as well as a reduction in the labor force and overhead. Furthermore, as a direct result of the use of this invention, less barking or skin abrasions will occur and there will result an improved appearance of freshness and a lesser loss of bloom and a minimum of fluid carry-over in the form of under skin water pockets within the individual birds.

Other objects of this invention are (a) to increase the yield and output capacity of the poultry processing plant expense, (b) to reduce the chilling time cycle for freshly killed poultry, and (c) to reduce the water carry-over in poultry due to soaking in vats, and (d) to reduce the volume of water and ice normally required for the chilling of each pound of poultry processed.

Many other objectives and advantages of this invention for a process and apparatus for chilling poultry will become more readily apparent to those skilled in this art as the invention becomes better understood from the following detailed description taken in conjunction with the accompanying drawings in which like characters of reference refer to corresponding parts throughout the several views, and wherein.

Figure 5:
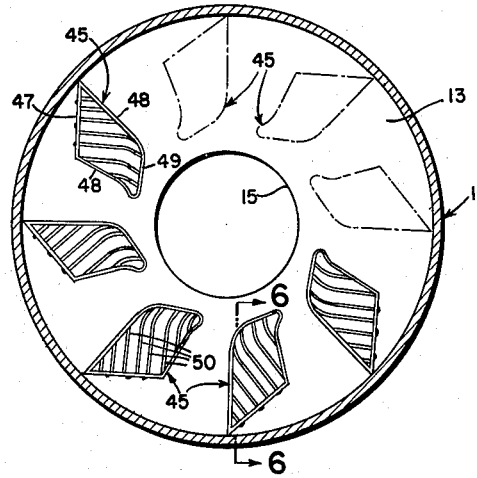
FIG. 5 is an enlarged transverse view of the reticulated lifting baffles taken substantially along the plane of section line 5—5 of FIG. 4.
Figure 6:
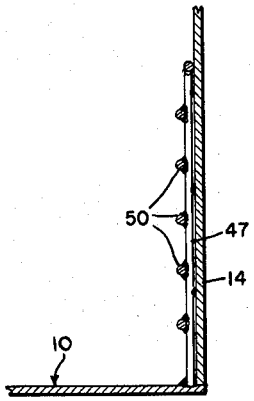
Figure 4:
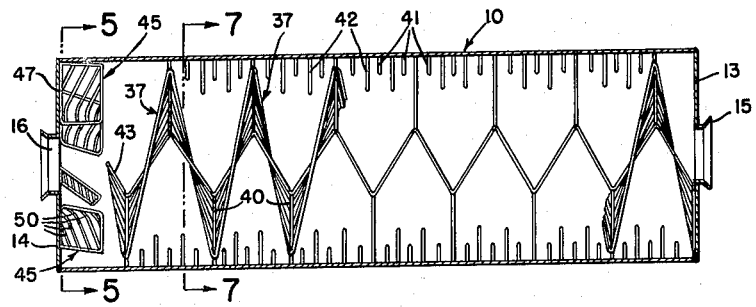
FIG. 4 is a longitudinal sectional view of one of the revolving drums taken substantially along the plane of section line 4—4 of FIG. 2, omitting the exterior driving means on the drum and draining platform, illustrating a partially completed reticulated helical baffle and lifting and drain baffles at one end thereof.
Figure 7:
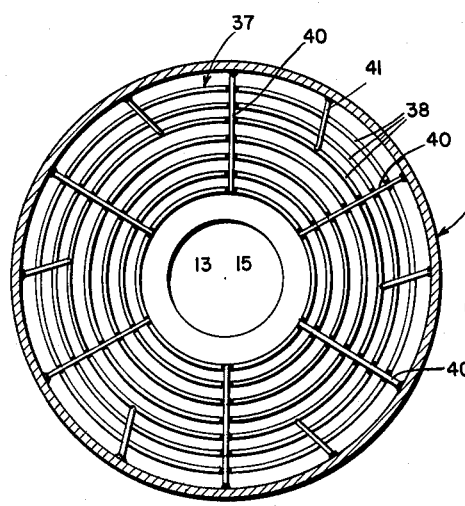

FIG. 6 is an enlarged partial transverse sectional view taken substantially along the plane of section line 6—6 of FIG. 5 illustrating the mounting of a lifting fork or baffle on the drum head; and FIG. 7 is a slightly enlarged transverse sectional view taken substantially along the plane of section line 7—7 of FIG. 4 illustrating the reticulated baffle or fence and projecting poultry tumbling fence.

Figure 2:
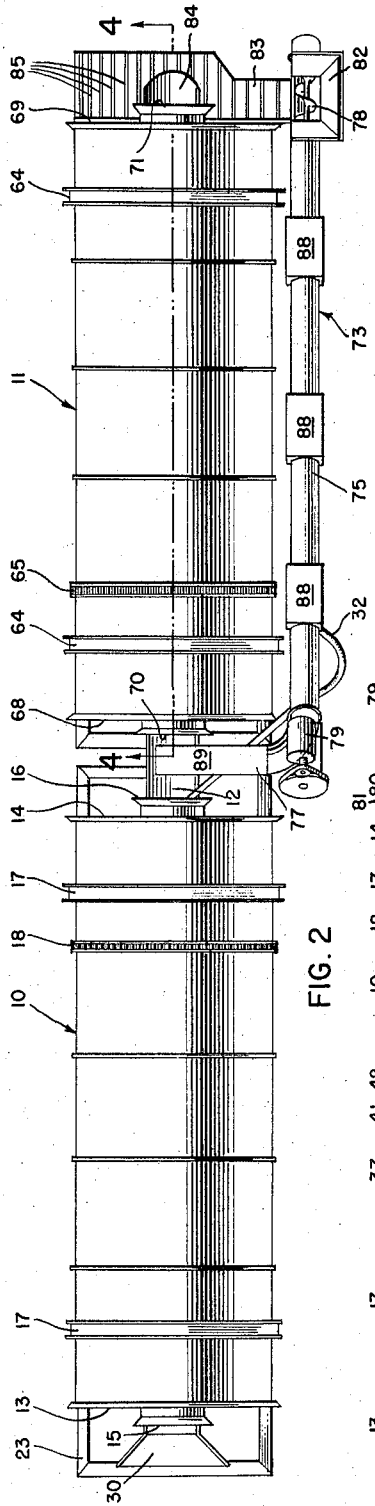
FIG. 2 is a top plan view of FIG. 1.
Figure 1:
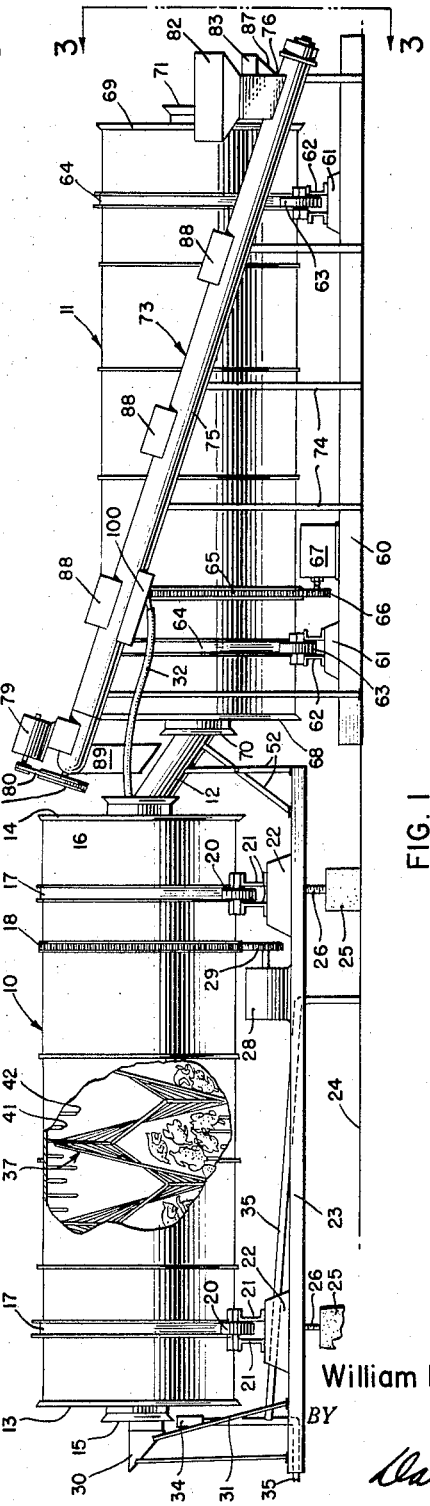
FIG. 1 is a side elevational view of the continuous poultry chilling apparatus construction of this invention with a portion of one drum removed to exhibit a portion of the internal reticulated baffle.
Figure 3:
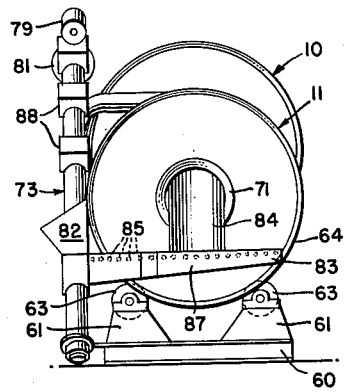
FIG. 3 is an end elevational view of the discharge end of the second chiller drum apparatus taken from the plane of line 3—3 of FIG. 2.

Referring to the drawings and particularly to FIGS. 1 through 3, there is illustrated a poultry chilling system in which a first stage chiller drum 10 and a second stage chiller drum 11 are aligned for feeding from the exit of the first drum to the entrance of the second drum through the interconnecting chute 12 that is supported therebetween for conveying poultry from one drum to the other. The first or initial quenching drum 10 is a cylindrical unit with opposite head ends 13 and 14 having centrally located flared entrance and discharge openings 15 and 16, respectively. The drum 10, preferably fabricated of a non-corrosive metal such as stainless steel, has a pair of axially spaced circumferential roller guide tracks 17 and a circular rack 18 mounted on the outer circumference of the drum. Bearing guide rollers 20 on opposite sides of the base frame 23 form a saddle for rotatably supporting the drum 10 as shown substantially in FIG. 3 for the second chiller unit 11, with the rollers being mounted in suitable bearing blocks supported on the channels 21 which channels are fastened to pads 22 that are secured to the welded rectangular base frame 23 which supports the assembled first stage chiller drum unit.

The assembled drum unit mounted on the frame 23 is supported above the ground level 24, usually the floor or deck of a poultry plant, on vertical reinforced concrete footings or blocks 25. In some installations, leveling screws 26 may be employed to vary the inclination of the drum axis depending upon, among other reasons, whether parallel or counterflow heat transfer medium is preferred in each unit. An electric motor and variable speed transmission unit 28 is mounted on the frame 23 for driving the pinion gear 29 which is in driving engagement with the rack 18 on the drum for revolving the drum about its axis at the desired rotational speed. This speed of rotation will obviously vary considerably depending upon (a) the diameter of the drum, (b) the length of the drum, (c) the temperature and volume of the chilling medium used in the drum, and (d) the mean temperature difference and weight of the poultry charge continuously entering and leaving the chiller, as well as other factors including the ambient temperature, at what stage in the processing the birds are introduced into the chiller and whether a single or multiple stage chilling unit is employed. As will be readily apparent to those skilled in this art, each unit may be engineered for existing operating conditions although for some established or standard operations a predesigned package unit may be installed and will be satisfactory, within limits, for the existing conditions.

An inlet supply chute 30 is supported in a suitable manner, as by the legs 31, to a frame 23 permitting the drum to revolve continuously without interference from the chute while poultry is deposited on the chute for introduction through the entrance opening 15 to be quenched in the chilling medium retained and flowing through the drum. The chilling medium for the first stage unit is preferably chilled water which is pumped from the second stage unit (to be described hereinafter) through the conduit 32 into the discharge opening 16 at the rear of the first unit. Preferably this chilled water is at a temperature of approximately 32 degrees F. and will flow in a counterflow direction from the travel of the poultry, in the unit illustrated, through the drum for discharge as overflow from the entrance opening 15 into the open drain trough 34 which is connected to the drain line 35. Unless recovered, this overflow water will flow into a trench that is discharged into a sewer line.

The overflow water being discharged from the first chiller unit may have a temperature of approximately 55 degrees F. to 70 degrees F., however, it is to be observed that the freshly killed poultry entering the first chiller unit may be at a temperature considerably above the discharged water temperature. In the preliminary processing of the poultry incident heat is absorbed from the scalding operation which varies in temperature from at least 120 degrees F. to above 130 degrees F. for approximately 30 seconds after which the birds are plucked and then singed at higher temperatures thereby further adding additional incident heat to the bird. In more modern operations, the plant is so mechanized that the birds are suspended from a traveling conveyor belt that moves, in some installations, at the rate of 5000 birds per hour. Thus, due to this rapid processing of freshly killed poultry with natural body temperature of 107 degrees F., most of the heat is retained by the bird and additional heat is absorbed and heat dissipation at ambient temperatures of 65 degrees F. to 80 degrees F. is rather low, resulting in a body temperature of about 100 degrees F. entering the chiller.

Within the first unit is a reticulated baffle 37, which is fabricated preferably of stainless steel rod to form a helical screw with spaced flights being affixed to the internal wall of the drum. The pitch of the helical poultry conveying means or baffle is such that the individual birds may be segregated as much as possible from each other during conveyance or travel through the drum in the chilling medium with the birds being immersed from the initial quenching to the discharge position. As more clearly shown in FIGS. 4 and 7, the baffle or fence 37 is fabricated with the helical convolutions 38 of rod forming a conveyor screw extending longiudinally through the drum with intermediate support positions for the screw being provided by the radially inwardly extending rods 40 that are secured to the inner wall to which the tubing is secured as by welding or other means.

Although it has been found most desirable to utilize the type baffle illustrated which facilitates cleansing and reduces maintenance considerably, this type fabrication also permits the free flow of the chilling medium through the drum unimpeded and also assures thorough immersion of the birds in the chilling medium with some agitation of the medium around the birds. The size of the openings in the baffle also promotes a gentle tumbling action continuously for the individual birds through the drum with the birds tending to roll randomly and slide to expose a maximum surface area to the chilling medium. The multitude of irregular surfaces of the baffle also tends to agitate the chilling medium and thereby reduce stratification of temperature zones or levels in the chilling liquid as is so characteristic in vat or tank type chilling. However, other types of construction for conveying means may be employed and are contemplated but the baffle illustrated is preferable for the advantages hereinbefore enumerated.

To further provide random tumbling, a plurality of inwardly projecting inclined fins or rods 41 and 42 are fastened to the inner wall of the drum throughout the length thereof. While there is illustrated only two different lengths for the fins 41 and 42, many variations may be provided in order to increase or decrease the tumbling action for the poultry passing in a directed path of travel through the chilling medium. It is to be noted that the fins have round ends in order to reduce bruising and puncturing of the birds' skin, and are inclined backward about 30 degrees to eliminate hanging and makes them self-cleaning.

Adjacent to the terminal end 43 of the baffle and welded to the discharge head end 14 of the drum is a plurality of lifting forks or elevating grates 45 each of which is supported in an inclined position in order to pickup one or more birds from the chilling medium in the lower portion of the drum as the drum revolves. The grate will support the bird or birds thereon for a partial drum revolution until the bird or birds slide or fall from the grate for discharge onto the chute 12 which extends into the discharge opening 16 in the rear of the first chilling unit. Each of the lifting forks 45 is fabricated of stainless steel tubing or rod material similar to the baffle 37. Each fork 45 has a framework with one side 47 welded or bolted to the drum head end 14 and the terminal ends of the sides 48 are bent upwardly to provide a scoop with the side 49. Spaced grate members 50 are welded to the framework to support the birds thereon and to permit draining of any chilling medium surrounding the birds lifted from the chilling medium.

The chute 12 between the first and second chilling units is supported by the legs 52 that are mounted on the frame 23 with the chute being positioned to receive birds discharged from the lifting forks 45 and then transferring them to the second chiller unit.

The second chiller unit 11 comprises a cylindrical drum similar to and mounted substantially in the same manner as the first chiller unit. The frame 60 supporting the second unit may be mounted directly on the floor 24 at an elevation lower than the first unit to facilitate the transfer of the poultry from one chiller unit to the other. Pads 61 are mounted on the rails of the frame 60 onto which channel members 62 are fastened in some suitable manner for supporting bearing blocks in which the drum supporting rollers 63 are retained on opposite sides of the frame to form the saddle for the revolving drum substantially as shown in FIG. 3. The longitudinally spaced tracks 64 encircling the outer surface of the drum are cooperatively received by the rollers for revolving the drum about its axis. The drum encircling rack 65 engages the pinion 66 that is driven by the motor driven variable transmission unit 67 which is supported on the frame substantially as described in the first chiller unit.

The drum of the second chiller unit is provided with entrance and discharge drum heads 68 and 69 in which there are flared inlet and discharge openings 70 and 71, respectively. As the internal structure within the second chiller unit is substantially identical in construction and operation as the internal structure of the first chiller unit, including the reticulated baffle or fence 37, the lifting forks 45 and the fins 41 and 42, a further detailed description is unnecessary for a full understanding of this invention.

A slush ice and water circulator 73 is mounted adjacent to one side of the second chiller unit and supported in an inclined position by means of the vertical stanchions 74 with the circulator duct or trough 75 extending longitudinally from the inlet end 76 at the discharge end of the second unit to the discharge end 77 adjacent to the entrance 70 to the second chiller unit. An auger or helical feed screw 78 is rotatably mounted and supported in and extends through the trough 75 with a motor driven variable transmission drive unit 79 mounted at the discharge end 77 to drive, through the flexible connector 80 or other suitable power transmission means, the pulley 81 mounted at the terminal end of the auger shaft extending through the duct housing.

At the inlet side 76 of the conveyor is a hopper 82 communicating with the auger, for receiving slush, chip, briquette or flake ice or other granulated forms of ice which may be suitable for mixing with water to form a chilling slurry which may be caused to flow or travel with the poultry without injuring the skin thereof. It will be readily apparent that briquette ice also may be used by discharging it directly into the chute 12 together with the poultry for mixing with water introduced into the drum 11. At the discharge end 71 of the chiller drum 11 is a drain table or platform 83 onto which the chute 84 will discharge the birds from the lifting forks. The birds discharged from the drum will remain on the drain table 83 until removed by an operator or carried away by a suitable conveyor belt from the chute. The drain table is provided with rods 85 that are spaced from each other and supported above the inclined trough 87. The inclined trough 87 will receive the carry-over slurry of water and ice and return it into the conveyor to which the trough is connected at one end thereof. Spaced inspection doors 88 are provided in the reach of the trough to permit maintenance of auger bearings and periodic cleansing of the trough and auger. The chilled poultry that is removed from the drain table may then, according to the previous processing operations, be rehung on a traveling conveyor for evisceration, sorting for size, or be packaged and iced for refrigeration or shipment. In those applications where chemical treatment is desired, an automatic feeder for chlorine or other chemicals may be introduced at any stage in the operation, such as on the drain table or in the hopper 82.

Make-up water and ice may be introduced periodically, or continuously as demanded, into the hopper 82 in order to maintain the desired chilling medium temperature. As the fluid or slurry is conveyed through the duct 75 under a positive pressure, a portion of the water in the slurry may be transmitted or pumped through the strainer and bleed-off box 100 into the conduit 32 leading to the first chiller unit for use therein with the remainder of the water in the slurry of ice and water being discharged from end 74 of the conveyor 73 onto the chute 89 which communicates with the entrance chute 12 of the first chiller unit to be mixed with the incoming pre-chilled birds from the first chiller unit. A suitable orifice may be positioned in the discharge of the bleeder box to control the flow of 32 degrees F. water to the first stage unit.

Obviously for some installations, only a single chiller unit of the proper design may be employed without severely modifying the inventive concept. It will also be evident that by use of the apparatus disclosed, a minimum amount of water or other chilling and cooling media will be necessary to achieve the desired temperature of the poultry that is continuously being supplied to the chilling apparatus for removal of body and incident heat in a minimum period of time thereby eliminating objectionable water penetration of the meat or "water logging," underskin water and water carry-over. The present apparatus and method also eliminate the need for synthetic preservatives for flavor and bacteria growth which is necessary where polonged periods of chilling are necessary as in stagnant vats.

In the processing of the poultry, the birds may be eviscerated initially before chilling, with the edible parts either packaged separately and reintroduced into the bird before or after the chilling operation, or the birds may be eviscerated after the chilling process. The birds are supplied continuously to the chute 30 and quenched by dropping them into the chilling medium in the drum or vessel with the birds continuously advancing in the vessel with the gentle tumbling motion to expose a maximum surface area along a predetermined path of travel by means of the internal reticulated conveying screw which will urge the poultry through the chilling medium of water or a slurry of ice and water. Ultimately the birds will be lifted or elevated at the end of the travel and drained prior to discharging for further processing or additional drainage on a draining platform.

In the application of the process of chilling poultry continuously and the apparatus for chilling poultry, many variations in the steps of the method and modifications to the apparatus may be made in the light and the spirit of the inventive concept as disclosed herein in order to achieve the optimum chilling temperatures and efficiency without deviating from the principles set forth therein, and these modifications to the steps and the process and modifications to the apparatus are contemplated. Therefore, within the inventive concept many modifications are contemplated as well as the use of mechanical equivalents to achieve the requisite chilling action within the requisite time cycle and these modifications and alternatives come within the appended claims.

What is claimed is:

1. Apparatus for chilling processed poultry comprising a first cylindrical drum for containing a chilling medium entirely therewithin, means for supporting and revolving said drum substantially about a horizontal axis, said drum having inlet and discharge openings at opposite ends of the drum, a reticulated means internally mounted in the drum for conveying poultry continuously at a uniform rate from the drum inlet opening to the drum discharge opening through a chilling medium in the drum, said drum also having projecting fins spaced between the reticulated means to facilitate a tumbling action for the poultry and to reduce compaction, poultry lifting means adjacent to the discharge opening in said drum, a second cylindrical drum in spaced alignment with the first drum for containing a chilling medium entirely therewithin, means for supporting and revolving said second drum substantially about a horizontal axis, said second drum having inlet and discharge openings opposite ends of the drum, a chute for receiving poultry from the lifting means in the first drum to discharge said poultry into the inlet opening of the second drum, said second drum having reticulated means internally and projecting fins for conveying and tumbling the poultry in a directed path of travel through the chilling medium, poultry lifting means in the second drum adjacent to the discharge end of the second drum to receive poultry discharged thereto by the reticulated means, a drainage platform for receiving poultry discharged from the second drum by the lifting means, means for introducing and draining a liquid chilling medium from the first drum and means for introducing and draining a slurry of ice and water in the second drum.

2. Apparatus for chilling processed poultry comprising first and second spaced apart cylindrical drums for retaining therein a liquid chilling medium, means for supporting and revolving said drums substantially about a hoizontal axis, each of said drums having entrance and discharge openings, a reticulated baffle means in each drum for advancing poultry at a predetermined rate therethrough while subjecting the poultry to a gentle tumbling action during travel of the poultry along a substantially helical path of travel as the poultry is immersed in a chilling medium flowing through at least one of the drums, lifting means within the first drum for discharging the poultry from the first drum to the second drum, means for receiving and conveying poultry discharged from the first drum to the second drum, means for conveying a slurry of ice and water from the second drum to the first drum, lifting means in the second drum for discharging the chilled poultry from the second drum, and poultry drainage means mounted adjacent to the discharge end of the second drum for supporting discharged poultry.

3. Apparatus for chilling continuously traveling mass quantities of processed poultry comprising a cylindrical drum for containing a chilling medium therein and having one end head with an inlet opening and one end head with a discharge opening means for supporting and revolving said drum about its longitudinal axis, means in the drum for advancing poultry in a directed partially helical path of travel through a chilling medium from the inlet to the discharge openings, means for displacing poultry substantially radially during the movement in the path of travel poultry elevating means communicating with the poultry advancing means for discharging the poultry from within the drum, and means for circulating a slurry of ice and water from the discharge opening to the inlet opening of the drum.

4. Apparatus for chilling continuously traveling large numbers of processed poultry comprising a cylindrical drum for containing a chilling medium therein and having one end head with an inlet opening and one end head with a discharge opening, means for revolving said drum about its longitudinal axis, baffle means in the drum for advancing poultry in a directed path of travel while maintaining the poultry immersed in a chilling medium, means for urging the poultry during advancement substantially in a radial direction for a short distance, poultry lifting means within the drum for receiving and elevating the poultry from the baffle means for discharging poultry from within the drum through the discharge opening, poultry drainage means mounted adjacent to the discharge opening in the drum for receiving poultry discharged from the drum by the lifting means, and means for circulating the slurry of ice and water including drainage received from the drainage means from the discharge end of the drum to the inlet opening of the drum.

References Cited by the Examiner

UNITED STATES PATENTS

| | | | |
|---|---|---|---|
| 916,290 | 3/1909 | Fleming | 134—94 |
| 1,420,740 | 6/1922 | Petersen | 62—64 |
| 1,435,285 | 11/1922 | Foster | 134—65 |
| 1,458,991 | 6/1923 | Pique | 62—374 |
| 1,779,046 | 10/1930 | McNaney | 134—132 |
| 1,907,649 | 5/1933 | Marx | 62—374 |
| 2,080,542 | 5/1937 | Kuss | 259—2 |
| 2,102,506 | 12/1937 | Bland | 62—375 |
| 2,427,388 | 9/1947 | Curran | 51—164 |
| 2,794,326 | 6/1957 | Mencacci | 62—64 X |
| 2,942,429 | 6/1960 | Van Dolah et al. | 62—64 |

EDWARD J. MICHAEL, *Primary Examiner.*

ROBERT A. O'LEARY, D. R. MATTHEWS, *Examiners.*